United States Patent
Mori et al.

(10) Patent No.: US 7,809,997 B2
(45) Date of Patent: Oct. 5, 2010

(54) SEMICONDUCTOR DEVICE, UNIQUE ID OF SEMICONDUCTOR DEVICE AND METHOD FOR VERIFYING UNIQUE ID

(75) Inventors: Yasufumi Mori, Tokyo (JP); Katsuhiko Azuma, Tokyo (JP); Manabu Miura, Tokyo (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 494 days.

(21) Appl. No.: 11/806,226

(22) Filed: May 30, 2007

(65) Prior Publication Data

US 2007/0296403 A1      Dec. 27, 2007

(30) Foreign Application Priority Data

Jun. 5, 2006  (JP) .............................. 2006-155583
Jun. 28, 2006 (JP) .............................. 2006-178000

(51) Int. Cl.
*G01R 31/28*   (2006.01)
*G11C 29/00*   (2006.01)

(52) U.S. Cl. ........................... 714/718; 714/724
(58) Field of Classification Search ................ None
See application file for complete search history.

(56) References Cited

U.S. PATENT DOCUMENTS

| 6,049,624 | A  | * | 4/2000  | Wilson et al. ............... 382/145 |
| 6,108,261 | A  | * | 8/2000  | Kim et al. .................. 365/225.7 |
| 6,285,603 | B1 | * | 9/2001  | Ku et al. ..................... 365/200 |
| 6,459,633 | B1 | * | 10/2002 | Jeffery et al. ............... 365/200 |
| 6,477,102 | B1 | * | 11/2002 | Matsui ...................... 365/225.7 |
| 6,563,745 | B1 | * | 5/2003  | Ilkbahar .................. 365/189.07 |
| 6,653,711 | B1 | * | 11/2003 | Dhanasekaran et al. ..... 257/529 |
| 6,762,969 | B2 | * | 7/2004  | Sasaki et al. ............. 365/225.7 |
| 7,076,663 | B2 | * | 7/2006  | Kelley et al. ................ 713/184 |
| 7,203,842 | B2 | * | 4/2007  | Kean ......................... 713/189 |
| 7,377,608 | B2 | * | 5/2008  | Walmsley et al. ............. 347/13 |
| 7,386,732 | B2 | * | 6/2008  | Kelley et al. ................ 713/184 |
| 7,489,180 | B2 | * | 2/2009  | Marshall .................... 327/525 |
| 2001/0015919 | A1 | * | 8/2001 | Kean .......................... 365/200 |
| 2006/0215433 | A1 | * | 9/2006 | Fischer et al. ................ 365/60 |
| 2007/0217276 | A1 | * | 9/2007 | Sugisawa ................. 365/225.7 |

FOREIGN PATENT DOCUMENTS

JP      2003-101527 A      4/2003

* cited by examiner

*Primary Examiner*—Kevin L Ellis
*Assistant Examiner*—Daniel F McMahon
(74) *Attorney, Agent, or Firm*—Buchanan Ingersoll & Rooney PC

(57) ABSTRACT

The present invention relates to a semiconductor device, a unique ID of the semiconductor device and a method for verifying the unique ID. Thus, original data (bit string) having 127-bit length [126:0] is inputted at step S1. Then, it is determined whether the number of bits of "1" in the bit string [126:0] inputted at the step S1 is more than the half of the bits of the bit string (that is, not less than 64) or not at step S2. When the number is not less than 64, the process proceeds to step S3. At the step S3, the bit string [126:0] is inverted and an invert bit [127] is set to "1". Then, the process proceeds to step S5. At the step S5, the fuse corresponding to the bit string [126:0] and the bit [127] are cut by LT.

2 Claims, 10 Drawing Sheets

FIG. 3A
| POR | A |
|---|---|
| 1 | A[n:0] |
| 0 | X |
| X | X |
FIG. 3B
 : A[i]=0
FIG. 3C
 : A[i]=1
FIG. 4A
0011 1100 1111 1111 0000 1111 0101 1111      <u>A</u>
FIG. 4B
1100 0011 0000 0000 1111 0000 1010 0000_1   <u>B</u>
↑
INVERT BIT

WHEN DATA IS 8 BITS LONG
AND NO INVERT BIT EXISTS

| VARIATION BIT NUMBER | | PROBABILITY | | BIT VARIATION RATE |
|---|---|---|---|---|
| 0 | × | 1/256 | = | 0/256 |
| 1 | × | 8/256 | = | 8/256 |
| 2 | × | 28/256 | = | 56/256 |
| 3 | × | 56/256 | = | 168/256 |
| 4 | × | 70/256 | = | 280/256 |
| 5 | × | 56/256 | = | 280/256 |
| 6 | × | 28/256 | = | 168/256 |
| 7 | × | 8/256 | = | 56/256 |
| 8 | × | 1/256 | = | 8/256 |

= 1024/256
= 4

WHEN DATA IS 8 BITS LONG
AND INVERT BIT EXISTS

| VARIATION BIT NUMBER | | PROBABILITY | | BIT VARIATION RATE |
|---|---|---|---|---|
| 0 | × | 1/256 | = | 0/256 |
| 1 | × | 8/256 | = | 8/256 |
| 2 | × | 28/256 | = | 56/256 |
| 3 | × | 56/256 | = | 168/256 |
| 4 | × | 70/256 | = | 280/256 |
| 4 | × | 56/256 | = | 224/256 |
| 3 | × | 28/256 | = | 84/256 |
| 2 | × | 8/256 | = | 16/256 |
| 1 | × | 1/256 | = | 1/256 |

= 837/256
= 3.27

| BIT | A0 | ... | Am | Am+1 | ... | An |
|---|---|---|---|---|---|---|
| CONTENTS | CHIP INFORMATION | | | INSPECTION BIT OF CRC OPERATION | | |

| BIT | A0 | ... | Am | Am+1 | ... | An |
|---|---|---|---|---|---|---|
| CONTENTS | INSPECTION BIT OF CRC OPERATION | | | CHIP INFORMATION | | |

FIG. 13

| BIT | A0 | ... | Af | Af+1 | ... | Ak | Ak+1 | ... | An |
|---|---|---|---|---|---|---|---|---|---|
| CONTENTS | CHIP INFORMATION 1 | | | INSPECTION BIT OF CRC OPERATION | | | CHIP INFORMATION 2 | | |

FIG. 14A

| No. | A[mn:m1] |
|---|---|
| 1 | 00000000001 |
| 2 | 00000000010 |
| 3 | 00000000011 |
| 4 | 00000000100 |
| 5 | 00000000101 |
| 6 | 00000000110 |
| 7 | 00000000111 |
| 8 | 00000001000 |
| 9 | 00000001001 |
| 10 | 00000001010 |
| 11 | 00000001011 |
| 12 | 00000001100 |
| 13 | 00000001101 |
| 14 | 00000001110 |
| 15 | 00000001111 |
| 16 | 00000010000 |
| 17 | 00000010001 |
| 18 | 00000010010 |
| 19 | 00000010011 |
| ⋮ | ⋮ |

FIG. 14B

| No. | A[mn:m1] |
|---|---|
| 1 | 00000000001 |
| 2 | 00000000011 |
| 3 | 00000000101 |
| 4 | 00000000111 |
| 5 | 00000001001 |
| 6 | 00000001011 |
| 7 | 00000001101 |
| 8 | 00000001111 |
| 9 | 00000010001 |
| 10 | 00000010011 |
| 11 | 00000010101 |
| 12 | 00000010111 |
| 13 | 00000011001 |
| 14 | 00000011011 |
| 15 | 00000011101 |
| 16 | 00000011111 |
| 17 | 00000100001 |
| 18 | 00000100011 |
| 19 | 00000100101 |
| ⋮ | ⋮ |

FIG. 14C

| No. | A[mn:m1] |
|---|---|
| 1 | 00000000001 |
| 2 | 00000000100 |
| 3 | 00000000111 |
| 4 | 00000001010 |
| 5 | 00000001101 |
| 6 | 00000010000 |
| 7 | 00000010011 |
| 8 | 00000010110 |
| 9 | 00000011001 |
| 10 | 00000011100 |
| 11 | 00000011111 |
| 12 | 00000100010 |
| 13 | 00000100101 |
| 14 | 00000101000 |
| 15 | 00000101011 |
| 16 | 00000101110 |
| 17 | 00000110001 |
| 18 | 00000110100 |
| 19 | 00000110111 |
| ⋮ | ⋮ |

SEMICONDUCTOR DEVICE, UNIQUE ID OF SEMICONDUCTOR DEVICE AND METHOD FOR VERIFYING UNIQUE ID

BACKGROUND OF THE INVENTION

1. Field of the Invention

The present invention relates to a semiconductor device, a unique ID of the semiconductor device and a method for verifying the unique ID and more particularly, to a technique for shortening a manufacturing time in a SOC (System on Chip) having fuse cutting type of data recording means and a unique ID recorded in a fuse.

2. Description of the Background Art

Conventionally, there is a method for recording a unique identification number, that is, a unique ID uniquely allocated to each SOC (System on Chip) in order to implement a secure function in the SOC (for example, Japanese Patent Application Laid-Open No. 2003-101527).

Although this unique ID can be recorded in a flash ROM (Read Only Memory) and a HDD (Hard Disk Drive) that constitute a system using the above SOC, it is difficult to record it in a memory mounted on a SOC manufactured by a normal CMOS (Complementary Metal Oxide Semiconductor) process. Therefore, the manufacturing method of a general SOC comprises a method for forming a unique ID by cutting a fuse by laser trimming (referred to as the LT occasionally) and the like at a wafer test step before an assembly step.

Since this unique ID needs uniqueness to implement a secure function, chip information such as the lot number of the manufactured SOC, the wafer number of the cut SOC, the position (chip position) of the manufactured SOC on the wafer or a manufacturing date is used as the unique ID in general.

Thus, this chip information is related to "n" bits $A0$ to $An-1$ (n is a natural number) and in a fuse box having "n" fuses, each fuse is cut according to the values of the bits $A0$ to $An-1$ (for example, it is cut in the case of "1" and not cut in the case of "0").

Japanese Patent Application Laid-Open No. 2003-101527 discloses a technique for encrypting or decoding data using ID information recorded in a fuse by laser trimming and the like.

As described above, according to the unique ID, since the chip information is related to the fuse as the bit value, as the number of chips formed on one wafer is increased, the number of fuses is increased. Therefore, as it is miniaturized or its diameter is enlarged, it takes time to perform the LT. For example, in a case where 4000 chips can be formed on one wafer, when it is assumed that 128 fuses (128 bits) are provided in one chip and 64 fuses of its half is cut, the LT is needed $256000=64\times4000$ times in the wafer. Thus, the problem is that the manufacturing time of the semiconductor device such as the SOC becomes long.

In addition, although the chip information of the target SOC is used in order to implement a secure function in the unique ID in general, since the chip information has regularity and lacks in random nature, when the fuse is broken unexpectedly or worn out, there generated a plurality of same unique IDs accidentally.

Namely, since the chip number designating the chip position is serially set in the same wafer having the same lot number, when an error is generated in the chip number, at least two sets of chips have the same unique ID.

In addition, since the wafer number is serially set in the chip having the different wafer number but having the same lot number and positioned at the same position on the wafer, when an error is generated in the wafer number, at least two sets of chips having the same unique ID are generated.

Furthermore, since the lot number is serially set in the chip having the different lot number but positioned on the same place on the wafer, when the error is generated in the lot number, at least two sets of chips having the same unique ID are generated.

In addition, when the unique ID comprises the chip information only, in a case where the unique ID is decoded in one chip, the unique ID in another chip could be easily guessed based on that information. In this case, even when the unique ID is used for implementing the secure function, the secure function cannot be implemented.

Furthermore, since yield information and the like can be guessed from the chip information, the problem is that the information that a SOC manufacturer does not want an end user to know is disclosed.

However, there is the following problem in a case where the unique ID is constituted with data other than the chip information.

That is, in a case where the unique ID comprises random data with respect to each SOC, for example, when the unique ID is verified, it is necessary to prepare the same data as that of the unique ID in a tester as expectation value data to be compared and it is necessary to prepare the expectation value data corresponding to the number of the SOCs in the tester, which takes a lot of trouble.

In addition, since the expectation value is tested in the same function pattern in the test of the LSI in general, when the kinds of the expectation value is increased, it is necessary to prepare the test patterns so as to correspond the number of kinds, which takes a lot of trouble.

In addition, although the test pattern can be incremented every LSI based on one kind of test pattern, this is not practical because the setting of an initial value becomes complicated and it takes a lot of trouble at the time of retesting.

SUMMARY OF THE INVENTION

It is a first object of the present invention to provide a semiconductor device whose manufacturing time can be shortened. In addition, it is a second object of the present invention to provide a unique ID of a semiconductor device that is excellent in uniqueness and can be easily verified.

A semiconductor device according to the present invention cuts a fuse in a fuse group comprising the predetermined number of fuses so as to correspond to a bit to record data comprising the predetermined number of bits, in which the fuse group further comprises an invert fuse designating the inversion of the data in the recording, and when the number of a first fuse to be cut in the fuse group is more than the half of the predetermined number, the first fuse is not cut but the invert fuse is cut and a second fuse except for the first fuse and the invert fuse in the fuse group is cut.

Therefore, the number of laser trimming performed in recording data can be reduced. Thus, the manufacturing time can be shortened.

A unique ID of the semiconductor device according to the present invention is set uniquely in the semiconductor device, in which the unique ID of said semiconductor device comprises unique chip information containing information at the time of manufacturing of said semiconductor device and an inspection bit provided by executing a cyclic redundancy checking operation for the chip information.

As described above, since the unique ID comprises the unique chip information containing the information of the manufactured semiconductor device and the inspection bit provided by executing the cyclic redundancy checking operation for the chip information, its uniqueness can be enhanced and its random nature can be also enhanced as compared with the case where the unique ID comprises only the chip information. In addition, it is difficult to decode the information as compared with the case where the unique ID comprises only the chip information, so that the information a semiconductor manufacturer does not want an end user to know is prevented from being disclosed.

A first aspect of a method for verifying the unique ID of the semiconductor device according to the present invention comprising the steps of: (a) reading the unique ID of the semiconductor device in a tester connected to the semiconductor device, (b) executing the cyclic redundancy checking operation for the chip information of the unique ID of the semiconductor device in the tester, and (c) comparing a remainder value provided in the cyclic redundancy checking operation with an inspection bit of the unique ID of the semiconductor device and determining whether the unique ID of the semiconductor device is defective or not.

As described above, since the whole unique ID can be verified only by verifying the inspection bit of the cyclic redundancy checking operation in the tester, it can be easily verified whether the unique ID in each chip is defective or not.

A second aspect of the method for verifying the unique ID of the semiconductor device according to the present invention comprises a processing unit inside the semiconductor device and comprising the steps of: (a) instructing the processing unit to execute the cyclic redundancy checking operation for the chip information of the unique ID of the semiconductor device from a tester connected to the semiconductor device, (b) comparing a remainder value provided in the cyclic redundancy checking operation with an inspection bit of the unique ID of the semiconductor device, and (c) reading the information of the compared result in the tester and determining whether the unique ID of the semiconductor device is defective or not.

As described above, since the whole unique ID can be verified only by verifying the inspection bit of the cyclic redundancy checking operation by the processing unit in the semiconductor device, it can be easily verified whether the unique ID in each chip is defective or not. Furthermore, since only the information of the compared result is sent to the tester, the number of pins for testing can be reduced.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3A to 3C are views showing signals of an input terminal and an output terminal in the fuse box according to the embodiment 1;

FIGS. 4A and 4B are schematic views showing the effectiveness of an invert bit in a bit string recorded in the fuse box according to the embodiment 1;

FIG. 13 is a conceptual diagram to explain the constitution of a variation of the unique ID of the semiconductor device according to the embodiment 4;

FIGS. 14A to 14C are views showing the setting examples of the information of a chip position on a wafer in the unique ID of a semiconductor device according to an embodiment 5;

DESCRIPTION OF THE PREFERRED EMBODIMENTS

The semiconductor device according to the present invention is characterized in that the invert bit is provided and the whole number of bits is reduced by designating the inversion/non-inversion of other bits with it in the bit string that specifies data such as the unique ID and the like. Thus, the number of laser trimming (LT) (LT number) to cut the fuse can be reduced. Each embodiment will be described in detail with reference to the drawings.

Embodiment 1

Figure 1:
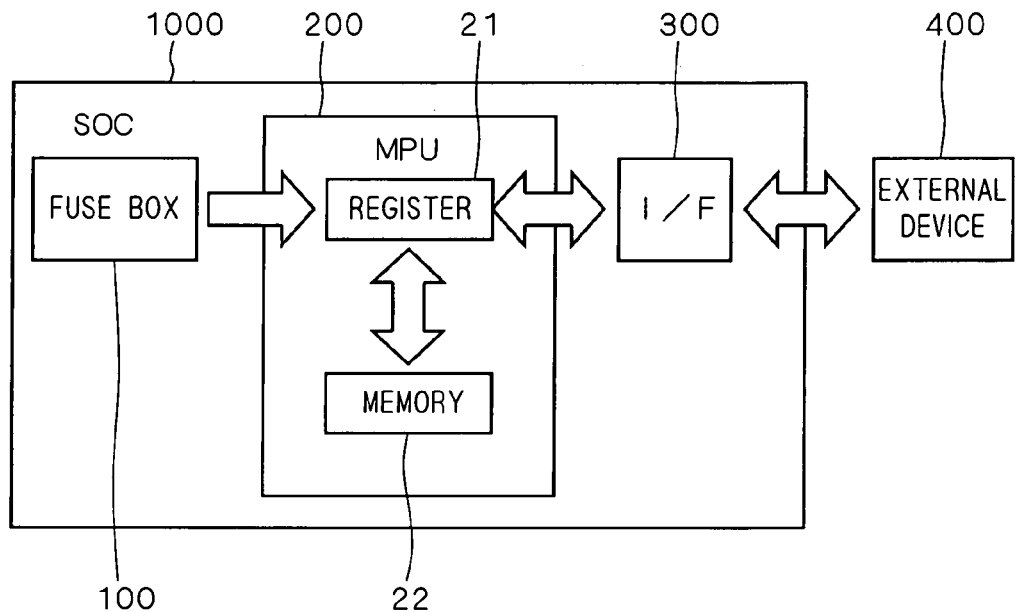
FIG. 1 is a block diagram showing the constitution of an SOC according to an embodiment 1.

FIG. 1 is a block diagram showing the constitution of a SOC (System on Chip) 1000 according to an embodiment 1.

As shown in FIG. 1, the SOC 1000 comprises a fuse box 100, a MPU (Micro Processing Unit) 200 (processing unit) and an I/F (interface) unit 30. The fuse box 100 has a plurality of fuses (not shown in FIG. 1) for recording a unique ID, and each fuse corresponds to each bit of the unique ID. The MPU 200 has a register 21 and a memory 22.

Referring to FIG. 1, the unique ID recorded in the fuse box 100 is read by the register 21 of the MPU 200 and transferred to an external device 400 through the I/F unit 300. Alternatively, it may be such that the unique ID read by the register 21 is transferred from the register 21 to the memory 22 and stored and processed there and read by the register 21 again and transferred to the external device 200 through the I/F unit 300.

Figure 2A:
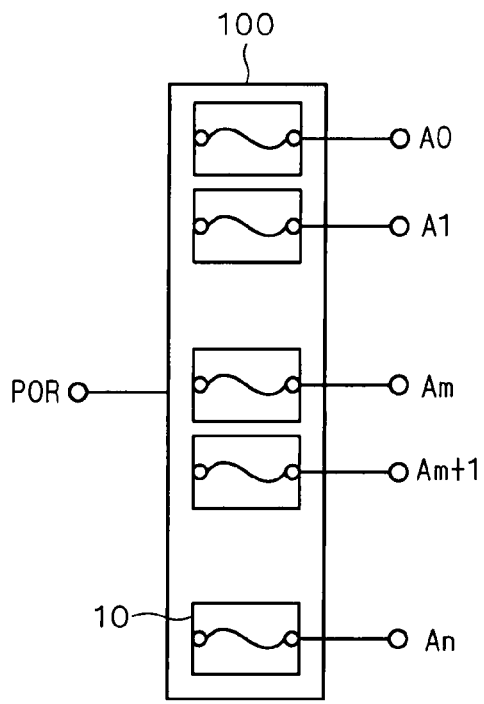
FIGS. 2A and 2B are block diagrams showing the constitution of a fuse box according to the embodiment 1.

FIG. 2A is a view schematically showing the fuse box 100 in which the unique ID is recorded on the SOC, and n+1 (n:natural number) fuses 10 are arranged in the fuse box 100 so as to correspond to each of A0 to An bits.

The unique ID is recorded by cutting the fuse 10 by laser trimming and the like so as to accord with the set unique ID.

Figure 2B:
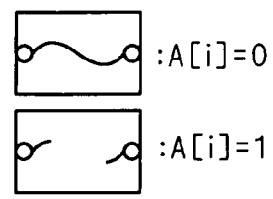

FIG. 2B shows the relation between the cut and uncut fuses 10 and recorded data in the fuse box 100.

As shown in FIG. 2B, when the fuse 10 is cut, data "1" is recorded and when the fuse 10 is not cut, data "0" is recorded.

In addition, as shown in FIG. 2A, the data of A0 to An bits is fixed in the fuse box 100 by a power-on reset signal POR such that the data is fixed by applying a voltage to the fuse when the power-on reset signal POR is in the state of "0" and the data is latched by changing the state of the power-on reset signal POR from "0" to "1" when the power is turned on.

FIG. 3A shows the relation of the output signals A0 to An to the power-on reset signal POR in the fuse box 100 shown in FIG. 2A. As shown in FIG. 3A, when the power-on reset signal POR is "0", the output signals A0 to An are not fixed and when the power-on reset signal POR is "1", the output signals A0 to An become recorded data, that is, becomes a bit string corresponding to the unique ID. That is, as shown in FIG. 3B, when the fuse 10 is not cut, Ai ($0 \leq i \leq n$) is "0" and as shown in FIG. 3C, when the fuse 10 is cut, Ai ($0 \leq i \leq n$) is "1".

FIGS. 4A and 4B are schematic views showing effectiveness of an invert bit in the bit string (unique ID) recorded in the fuse box 100 shown in FIG. 2A.

In FIG. 4A, a bit string A having 32-bit length is shown. According to the bit string A, 22 bits are "1" (corresponding to a first fuse in the present invention) and 10 bits are "0" among 32 bits. Therefore, since it is necessary to cut 22 fuses among 32 fuses 10, the LT number is 22.

In addition, FIG. 4B shows a bit string B having a 33-bit length in which one invert bit is added to the bit string having 32-bit length. According to the bit string B, each bit of the bit string A is inverted and the invert bit designating the invert of the bits is set to "1". That is, the bit string B expresses the same value as that of the bit string A in a different form by setting the invert bit to "1". According to the bit string B, 10 bits are "1" (corresponding to a second fuse in the present invention) and 22 bits are "0". Therefore, since it is necessary to cut 11 (the invert bit is added to the above 10 bits) fuses among 33 fuses 10, the LT number is 11.

That is, in a case where the number of bits of "1" is more than the half of the entire bits in the bit string A, the LT number can be smaller by providing the invert bit designating the inversion and setting the invert bit to "1" in the bit string B.

Figures 5, 6A, 6B:
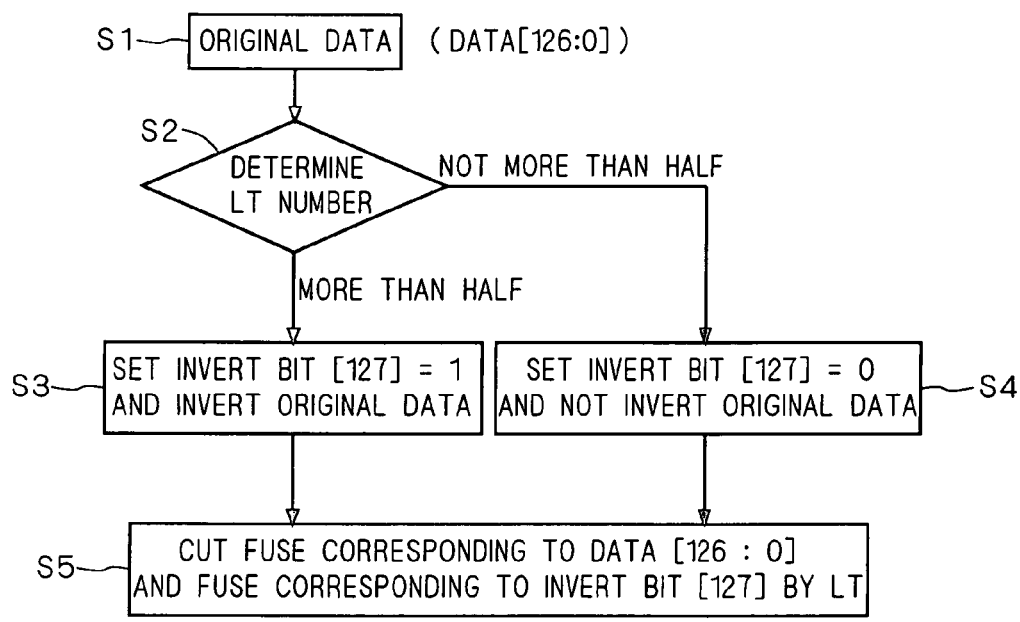
FIG. 5 is a flowchart showing steps (unique ID recording steps) of the manufacturing method of a semiconductor device according to the embodiment 1.
FIGS. 6A and 6B are views showing the difference in bit variation rate due to the absence and presence of the invert bit in the semiconductor device according to the embodiment 1.

FIG. 5 is a flowchart showing steps (unique ID recording steps) of a manufacturing method of the SOC 100 shown in FIG. 1 when the fuse box 100 has 128 (128 bits) fuses 10. It is assumed that a bit [127] is an invert bit in this bit string [127:0] having a 128-bit length.

First, original data having a 127-bit length (bit string)[126:0] is inputted to the MPU 200 at step S1.

Then, at step S2, the MPU 200 determines whether the number of bits of "1" is more than the half (that is, 64 or more) in the bit string [126:0] inputted at the step S1 or not. Then, when the number is 64 or more, the operation proceeds to step S3 and when it is less than 64, the process proceeds to step S4.

Then, the MPU 200 inverts the bit string [126:0] and sets the invert bit [127] to 1 at step S3. Then, the process proceeds to step S5.

Then, the MPU 200 sets the invert bit [127] to 0 without inverting the bit string [126:0] at step S4. Then, the process proceeds to step S5.

Then, the MPU 200 cuts the fuse corresponding to the bit string [126:0] and the bit [127] by the LT at step S5. Thus, the LT number can be reduced.

That is, referring to FIG. 5, the bit string [127:0] corresponds to a fuse group in the present invention and the bit [127] corresponds to an invert fuse in the present invention.

When it is assumed that the bit string [126:0] is random data, although the maximum value of the LT number is 127 in the conventional semiconductor device, the maximum value of the LT number can be reduced to 64 in the semiconductor device according to this embodiment (when it is more than 64, it can be reduced to be not more than 64 by inverting process with the invert bit). For example, while "1" are provided in series up to eight in the bit string A in FIG. 4A, "1" are provided in series up to four in the bit string B in FIG. 4B. That is, data continuity can be reduced by decreasing the number of "1" using the invert bit. Thus, decoding by others becomes difficult.

FIGS. 6A and 6B are views showing the difference in bit variation rate (ratio of the bit value that is "1") due to absence or presence of the invert bit in the case of data having a random bit string of 8 bits. FIG. 6A shows the case where there is no invert bit and FIG. 6B shows the case where the invert bit exists.

As shown in FIG. 6A, when there is no invert bit, the variation bit number (the number of bits whose value is "1") ranges from 0 to 8. Thus, since the probability that the variation bit number becomes k ($0 \leq k \leq 8$) is such that $8C_k/2^8 = 8C_k/256$, the total (expectation value) of the bit variation rate given by a calculation such that the variation bit number × probability is 1024/256=4.

Meanwhile, when the invert bit exists as shown in FIG. 6B, the variation bit number ranges from 0 to 4 (when the variation bit number is 5, 6, 7 and 8, since the variation bit number becomes 3, 2, 1 and 0 by the inverting operation, so that when the invert bit "1" is applied thereto, the variation bit number becomes 4, 3, 2 and 1). Since the probability is the same as that in FIG. 6A, as a result, the total (expectation value) of the bit variation rate given by a calculation such that the variation bit number×probability is 837/256=3.27. That is, the LT number can be reduced to 3.27/4=81.75% by setting the invert bit.

Thus, according to the semiconductor device in this embodiment, the LT number in recording the unique ID and the like can be reduced by decreasing the number of "1" using the invert bit. As a result, a manufacturing time can be shortened.

In addition, since the data is prevented from being continuous, decoding by others can be difficult. As described above, since chip information is used as the general unique ID, the chip information can be kept secret by preventing the decoding by others.

In addition, since the chip information is recorded only to ensure uniqueness, its contents are not used in the present invention. Therefore, it is not always necessary to decode the contents thereof accurately in a reading operation. Therefore, even when the invert bit is "1", it is not necessary to invert it before reading and it is even more preferable to read it without inverting it to enhance confidentiality (the uniqueness can be ensured when it is read without inverted).

In addition, when it becomes necessary to decode the inverted data to the value before inverted, it may be decoded by hardware or software.

Furthermore, although the description has been made of the case where the unique ID is recorded in the SOC in the above embodiment, the present invention is not limited to this, so that the present invention can be applied to any case where data is recorded using a fuse.

Namely, the present invention can be applied to not only the memory mounted on the SOC but also another product.

Figure 7:
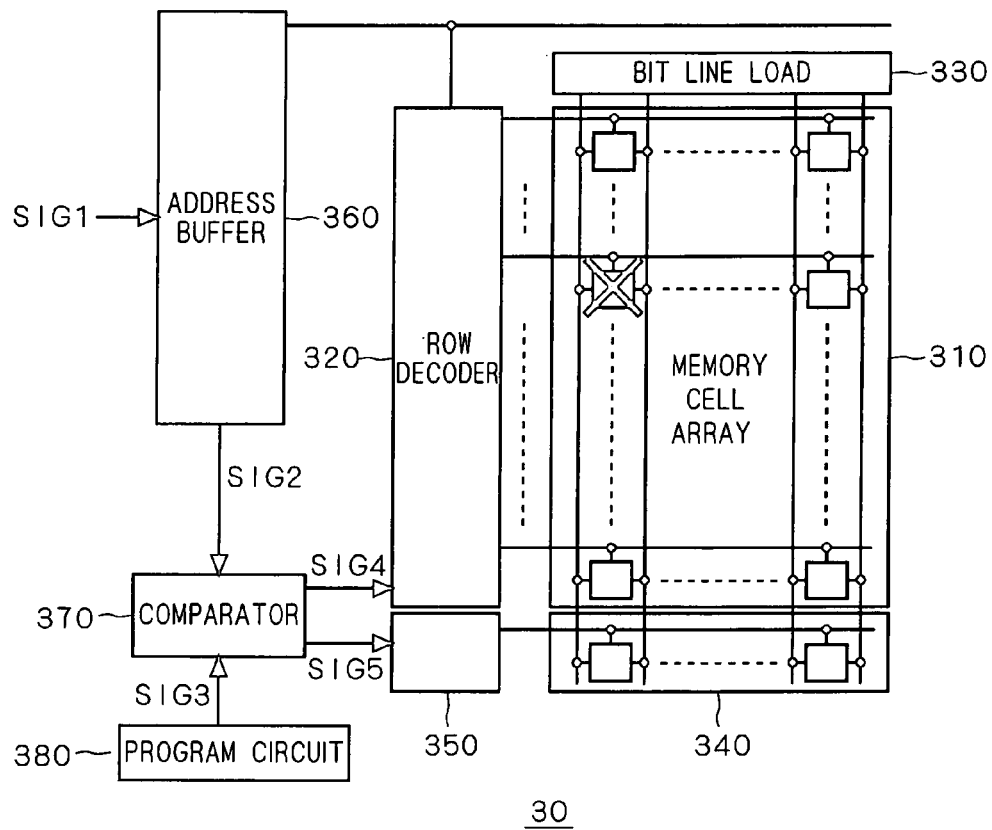
FIG. 7 is a block diagram showing the constitution of a redundancy circuit according to the embodiment 1.

In addition, the present invention can be applied to not only the unique ID but also a case where data is recorded on a redundant circuit using a fuse that is used in a memory in general as shown in FIG. 7, for example. A redundant circuit 30 shown in FIG. 7 comprises a memory cell array 310, a row decoder 320, a bit line load 330, a redundant (spare) cell 340, a redundant (spare) row decoder 350, an address buffer 360, a comparator 370, and a program circuit 380.

Referring to FIG. 7, an address signal SIG1 designating the address of the memory to be accessed is inputted to the address buffer 360. The address buffer 360 generates an input address signal SIG2 based on the inputted address signal SIG1 and outputs it to the comparator 370. In addition, the program circuit 380 generates a defective address signal SIG3 based on a defective address that is previously programmed by fuse cutting and outputs it to the comparator 370.

The comparator 370 compares the inputted input address signal SIG2 with the defective address signal SIG3 and when they matches with each other, it outputs a normal circuit inactivation signal SIG4 to the row decoder 320 to inactivate the memory cell array 310 and outputs a redundant circuit activation signal to the redundant (spare) row decoder 350 to activate the redundant (spare) cell 340. That is, by programming the defective cell in the memory cell array 310 as the defective address by cutting the fuse in the program circuit 380, the defective cell is put in the redundant (spare) cell 340 to be remedied. When the invert bit is used in the program of the defective address in the program circuit 380 similar to the recording of the unique ID as described above, the LT number can be reduced.

In addition, as described above, in the case where the data to be recorded is the unique ID, since the contents itself is not used, even when the invert bit is "1", it is not necessarily to be inverted to be read. However, in the case where the data to be recorded is the defective address of the redundant circuit 30, since it is necessary to read the defective address accurately (because when it is not accurately read, a normal cell could be replaced with the redundant cell 340), when the invert bit is "1", the data is to be inverted and read.

In addition, since there is a case where an internal voltage of a device or timing is adjusted with a fuse in a certain product, in this case also, when the invert bit is used, the LT number can be reduced similar to the recording of the unique ID or the program of the defective address as described above.

Embodiment 2

The description has been made of the case where one invert bit is set for the entire data comprising one bit string in the embodiment 1. However, data used actually include a part in which the ratio of the bit of "1" is extremely small in some cases and in this case, the LT number can be further reduced by removing such part from the object of the invert bit. That is, one invert bit may be set to only a part of the data comprising one bit string.

Figure 8:
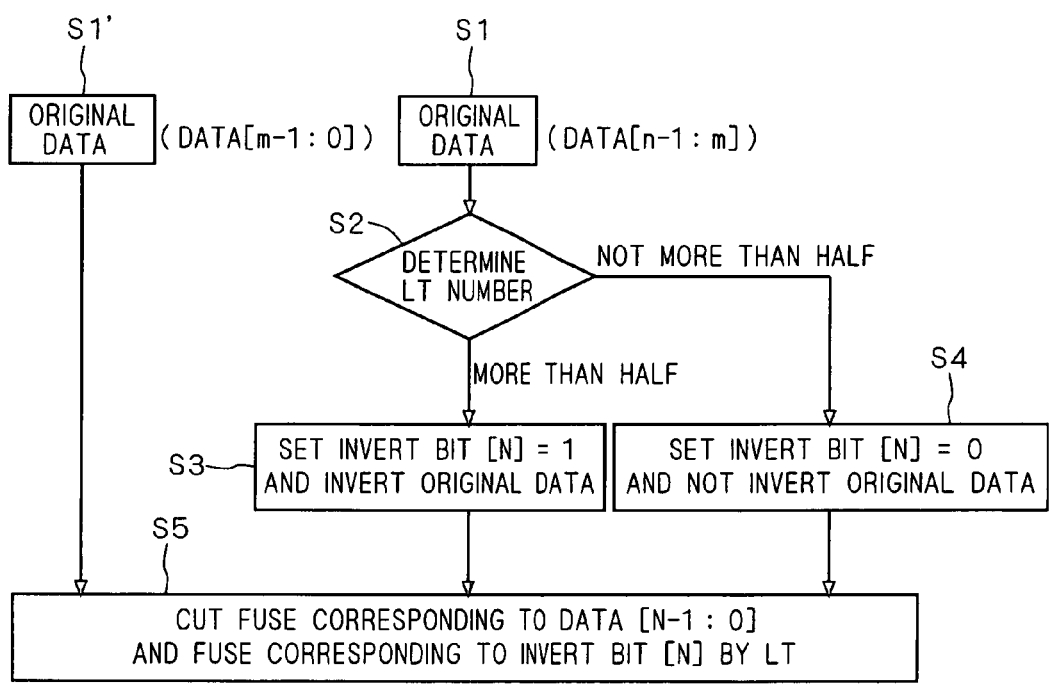
FIG. 8 is a flowchart showing steps (unique ID recording steps) of the manufacturing method of a semiconductor device according to an embodiment 2.

FIG. 8 is a flowchart showing steps (unique ID recording steps) of a manufacturing method of a semiconductor device according to an embodiment 2. Referring to FIG. 8, a bit [n] is provided as an invert bit for a bit string [n−1:0] of data having a n-bit length. This bit string [n−1:0] is divided into a bit string [m−1:0] having m-bit length and a bit string [n−1:m] having a (n−m)-bit length (m is a natural number not more than (n−1)), and the invert bit [n] is set only for the bit string [n−1:m]. That is to say, according to the flowchart in FIG. 8, step S1' is added to the flowchart in FIG. 5 according to the embodiment 1, so that the bit string [n−1:m] in the bit string [n−1:0] proceeds from step S1 to step S2 and the bit string [m−1:0] bit in the string [n−1:0] proceeds from step S1' to step S5 directly.

That is, in FIG. 8, the bit strings [n−1:m] and [m−1:0] correspond to first and second fuse groups according to the present invention.

For example, in FIG. 5, the invert bit is set to "1" only when the number of bits of "1" is 64 or more in the bit string [126:0] having the 127-bit length. Therefore, when the bit string [63:0] is all "0" and the bit string [126:64] is all "1" in the bit string [126:0], since the number of bits of "1" is 63, the invert bit is "0". Therefore, the number LT is 63 (actually, it is not very likely that all bits in the bit string become "0" or "1" although the ratio of "0" or "1" could be extremely high, but the most extreme case is taken as an example for convenience of explanation in this embodiment (the same is true in an embodiment 3)).

Meanwhile, referring to FIG. 8, when it is assumed that n=127 and m=64 in a case where the bit string [63:0] is all "0" and the bit string [126:64] is all "1" in the bit string [126:0], only the bit string [126:64] is to be inverted in the bit string [126:0]. That is, since the number of bits of "1" is more than the half in the bit string [126:64] (that is, 32 or more), the process proceeds from steps S1 and S2 to step S3 where the bit string [126:64] is inverted and the invert bit [127] is set to "1" and proceeds to step S5. Therefore, the LT number is one in the bit string [126:64]. In addition, as for the bit string [63:0], since the process proceeds from step S1' to step S5 directly, the LT number is 0 in the bit string [63:0]. Thus, the LT number in the bit string [126:0] is one in total.

Thus, according to the semiconductor device in this embodiment, in the data comprising one bit string, one invert bit is set such that a part in which the ratio of the bit of "1" is extremely small is removed from its object. Consequently, in addition to the effect of the embodiment 1, an effect that the LT number can be further reduced is provided.

Although the description has been made of the case where the bit string [126:0] is divided into the bit string [63:0] and the bit string [126:64] in the above embodiment, the present invention is not limited to this. For example, data may be divided at any position by the bit, or by the word or by the byte (the same is true in the embodiment 3).

Embodiment 3

The description has been made of the case where one invert bit is set for the data comprising one bit string in the embodiment 2. However, the present invention is not limited to this. For example, two or more invert bits may be set for data comprising one bit string.

Figure 9:
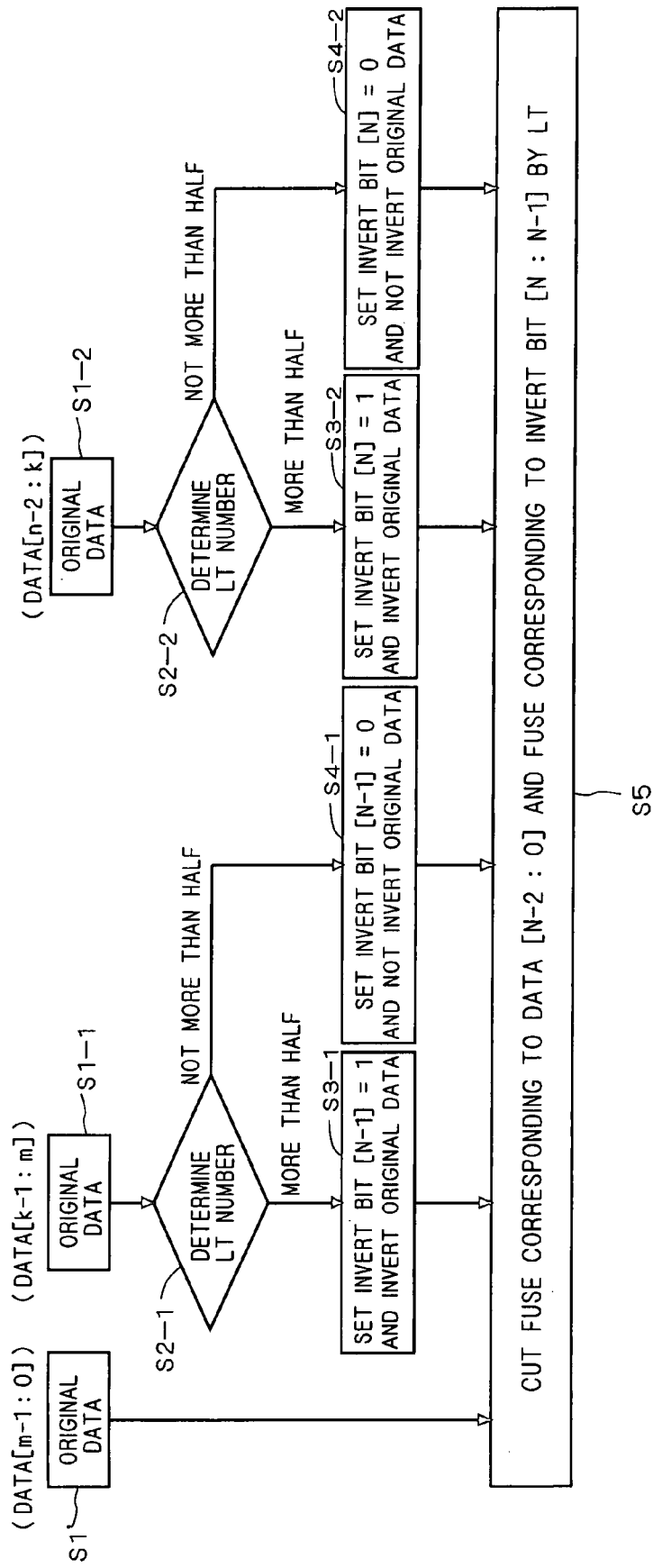
FIG. 9 is a flowchart showing steps (unique ID recording steps) of the manufacturing method of a semiconductor device according to an embodiment 3.

FIG. 9 is a flowchart showing steps (unique ID recording steps) of a manufacturing method of a semiconductor device according to the embodiment 3. Referring to FIG. 9, invert bits [n−1] and [n] are set for a bit string [n−2:0] of data having a (n−1)-bit length. It is assumed that the bit string [n−2:0] is divided into a bit string [k−1:0] having a k-bit length, a bit string [m−1:k] having a (m−k)-bit length, and a bit string [n−2:m] having a (n−m−1)-bit length (k is a natural number not more than (m−1)), and the invert bit [n−1] is set only for the bit string [m−1:k] and the invert bit [n] is set only for the bit string [n−2:m]. That is to say, according to the flowchart in FIG. 9, steps S1 to S4 in the flowchart in FIG. 8 according to the embodiment 2 are divided into steps S1-1 to S4-1 and steps S1-2 to S4-2 and they are performed for the bit string [m−1:k] and the bit string [n−2:m], respectively.

That is, the bit strings [m−1:k], [n−2:m] and the bit [n−1] and [n] in FIG. 9 correspond to the third and fourth fuse groups and the first and second invert fuses in the present invention, respectively.

For example, in FIG. 8, when it is assumed that n=127 and m=64 in the case where the bit string [63:0] is all "0" and the bit string [94:64] is all "1" and the bit string [126:95] is all "0" in the bit string [126:0], only the bit string [126:64] (that is, the bit string [94:64] and the bit string [126: 95]) is the object of the invert bit [127] in the bit string [126:0]. That is, since the number of bits of "1" is less than the half (that is, less than 32) in the bit string [126:64], the process proceeds from steps S1 and S2 to step S4 where the invert bit [127] is set to "0" without inverting the bit string [126:64] and proceeds to step S5. Therefore, the LT number is 31 in the bit string [126:64]. In addition, as for the bit string [63:0], since the process proceeds from step S1' to step S5 directly, the LT number is 0 in the bit string [63:0]. Thus, the LT number in the bit string [126:0] is 31 in total.

Meanwhile, in FIG. 9, when it is assumed that n=127 and m=64 and k=95 in the case where the bit string [63:0] is all "0" and the bit string [94:64] is all "1" and the bit string [126:95] is all "0" in the bit string [126:0], only the bit string [94:64] is to be inverted in the bit string [126:0]. That is, since the number of bits of "1" is more than the half (that is, 16 or more) in the bit string [94:64], the process proceeds from steps S1-1 and S2-1 to step S3-1 where the bit string [94:64] is inverted and the invert bit [126] is set to "1" and proceeds to step S5. Therefore, the LT number is 1 in the bit string [94:64]. In addition, as for the bit string [125:95], since the number of bits of "1" is less than the half (that is, less than 16), the process proceeds from step S1-2 and S2-2 to step S4-2 where the invert bit [127] is set to "0" without inverting the bit string [126:95] and the process proceeds from step S5. Therefore, the LT number is 0 in the bit string [125:95]. In addition, as for the bit string [63:0], since the process proceeds from step S1' to step S5 directly, the LT number in the bit string [63:0] is 0. Thus, the LT number in the bit string [126:0] is 1 in total.

Thus, according to the semiconductor device in this embodiment, the data comprising one bit string is divided into a plurality of regions and the invert bit is set every region. Therefore, in addition to the effect of the embodiment 2, the LT number can be further reduced.

In addition, although the description has been made of the case where a part of the bit string is removed from the object of the invert bit and the plurality of invert bits are set for the remaining part in the above embodiment, the present invention is not limited to this. For example, a plurality of invert bits may be set for the entire part of a bit string.

Embodiment 4

Figures 10, 11, 12:
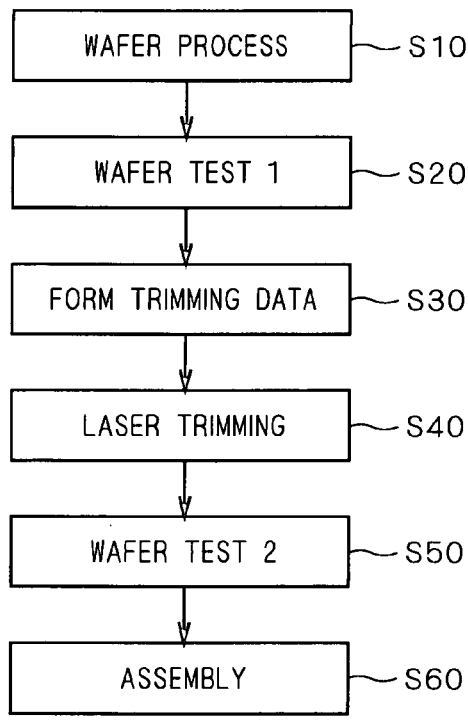
FIG. 10 is a conceptual diagram to explain the constitution of a unique ID of a semiconductor device according to an embodiment 4.
FIG. 11 is a view to explain recording steps of the unique ID to the use box.
FIG. 12 is a conceptual diagram to explain the constitution of a variation of the unique ID of the semiconductor device according to the embodiment 4.

FIG. 10 is a conceptual diagram to explain the constitution of the unique ID of the semiconductor device according to the present invention. As shown in FIG. 10, the unique ID of the semiconductor device according to the present invention comprises A0 to An bits and chip information is allocated to A0 to Am bits and inspection bits of CRC (Cyclic Redundancy Checking) operation are allotted to Am+1 to An bits.

Here, the chip information includes a lot number used in the manufacturing process of the semiconductor device in general, a wafer number of a wafer on which the semiconductor device is formed, chip position information for specifying the position of the semiconductor device on the wafer, a manufacturing data and the like, which is set to each chip as binary data and it is effective information to specify the chip.

In addition, the inspection bit of CRC operation means a remainder value obtained when CRC operation is performed for the chip information using a generator polynomial, and a cyclic code comprises an information bit and an inspection bit in the CRC operation. The CRC operation is performed to confirm that there is no error generated in transferring information, and it enhances the random nature of the unique ID by combining the inspection bit provided from the CRC operation and the chip information in this application.

In order to allocate the unique ID used in implementing a secure function to each SOC, a fuse is mounted on the SOC and the unique ID is recorded by cutting the fuse by laser trimming and the like so as to accord with the unique ID in the manufacturing process.

According to this constitution, the unique ID can be recorded on the SOC manufactured by a normal CMOS process also.

However, when the chip information of a chip A is "111011" and the chip information of a chip B is "111111", for example, in a case where the "0" bit of the chip information of the chip A is changed to "1" bit due to the defect of the fuse, the chip information of the chip A becomes the same as that of the chip B, so that the secure function of the unique ID is lost.

However, when the inspection bits provided from the CRC operation for the chip information "111011" of the chip A is "1100" and the inspection bits provided from the CRC operation for the chip information "111111" of the chip B is "1001", the unique ID of the chip A becomes "1110111100" and the unique ID of the chip B becomes "1111111001", so that both unique IDs are different in three bits.

Therefore, even when one bit data is changed due to the defect of the fuse, the unique ID of the chip A does not becomes the same as that of the chip B, so that the secure function of the unique ID can be maintained.

In addition, according to the present invention, since the CRC operation is not used to detect an error in transferring the information, the generator polynomial G(X) in the CRC operation may be a normally used one, so that $G(X)=X^7+X^3+1$ or $G(X)=X^{16}+X^{12}+X^5+1$ may be used according to the information amount of the chip information. Here, the former one is a generator polynomial used in the process called CRC 7 and the latter one is a generator polynomial used in the process called CRC 16. As one example of the CRC operation, as described above with reference to FIG. 1, when the unique ID is allocated to A0 to An, the chip information is allocated to A0 to Am and the inspection bits are Am+1 to An, the inspection bits are provided by a polynomial R(X) representing a remainder provided by dividing a polynomial M(X) $\cdot X^{n-m}$ provided for the polynomial M(X) designating the chip information, by the G(X).

Next, a recording process of the unique ID in the fuse box 100 shown in FIG. 2A will be described with reference to FIG. 11.

FIG. 11 is a flowchart to briefly explain the manufacturing steps of the semiconductor device, in which after various manufacturing steps (wafer process) at the stage of the wafer at step S10, various tests (wafer test 1) at the stage of the wafer are performed at step S20.

Then, trimming data to record the unique ID in the fuse box 100 is formed at step S30. This step includes the step for obtaining the inspection bit by performing the CRC operation to the chip information as described above and the trimming data comprises the chip information and the inspection bit.

Then, at step S40, the fuse 10 in the fuse box 100 is cut by laser trimming and the like based on the trimming data provided at the step S30 to record the unique ID.

Then, various tests (wafer test 2) at the stage of the wafer are executed at step S50 and the semiconductor device formed on the wafer is diced into chips and each chip is mounted on a lead frame to be bonded and then sealed by molding at an assembly step (step S6), whereby a packaged semiconductor device is completed.

According to the SOC 1000 comprising the fuse box 100 described with reference to FIG. 1, the MPU 200 receives the information of the unique ID from the fuse box 100 and generates an encryption key to implement the security function based on the unique ID. Then, the data is encrypted using this encryption key and transferred to the external device 400 through the interface unit 300.

For example, when the external device 400 is the system of a HDD (Hard Disk Drive), the data to be written in a hard disk assembly can be encrypted based on the unique ID.

In addition, when the encryption key is to be generated, the unique ID may be used as the encryption key as it is or the encryption key may be generated by combining it with other information.

Furthermore, although the description has been made of the unique ID with reference to FIG. 10 such that the chip information is allocated to the A0 to Am bits, and the inspection bits of the CRC operation are allocated to the Am+1 to An bits, the present invention is not limited to the above order. For example, as shown in FIG. 12, the inspection bit of the CRC operation may be allocated to A0 to Am bits and the chip information may be allocated to Am+1 to An bits. Alternatively, as shown in FIG. 13, it may be so constituted that chip information 1 is allocated to A0 to Af bits, the inspection bits of the CRC operation are allocated to Af+1 to Ak bits, and chip information 2 is allocated to Ak+1 to An bits. Here, entire chip information is divided into the chip information 1 and 2 for convenience and in this constitution, the random nature of the unique ID can be further enhanced, so that the secure function can be further improved.

Furthermore, instead of constituting the unique ID by arranging the chip information and the inspection bit of the CRC operation, a checksum data provided by adding the chip information and the inspection bit of the CRC operation may be used as the unique ID.

In this case, there is a method in which eight-bit data as one unit is added in a 16-bit or 32-bit addition area (register and the like) and a process in which the high-order bit overflowing from the addition area is ignored and the like is performed and the numeric value of 16 bits or 32 bits is used as the checksum data.

As described above, according to the unique ID in the embodiment 4 of the present invention, the unique ID comprises the chip information and the inspection bit of the CRC operation, and it is recorded in the fuse. Therefore, as compared with the case where the unique ID comprises only the chip information, uniqueness can be enhanced, so that even when the fuse corresponding to one bit becomes defective, it is prevented that the same unique ID is generated.

In addition, in the case where the unique ID comprises only the chip information, when the unique ID for one chip is decoded, for example, the unique ID for another chip could be guessed based on that information, so that even when the unique ID is used to implement the secure function, the secure function could not work. However, when the inspection bit of the CRC operation is used together, the ratio of fixed information is reduced and the random nature can be enhanced.

Furthermore, it becomes difficult to decode the information as compared with the case where the unique ID comprises only the chip information, so that information a SOC manufacturer does not want an end user not to know can be protected from being disclosed.

Embodiment 5

Although a setting method of the chip information constituting the unique ID is not particularly limited in the embodiment 4 of the present invention described above, the uniqueness of the unique ID can be further enhanced by devising the setting method of the chip information.

FIGS. 14A, 14B and 14C are lists showing setting examples of the information of the chip position on the wafer in the chip information, in which the relations between the chip number (No.) and the chip position information are shown. In addition, in FIGS. 14A to 14C, it is assumed that the chip position information is allocated to bits Am1 to Amn and the bits Am1 to Amn consist of 10 bits for simplifying the description. In addition, the chip number is allocated according to a predetermined rule to specify the chip position on the wafer, so that when the chip number is known, it can be determined that which position the chip is formed on the wafer.

FIG. 14A shows the example in which "0000000001" is set for the chip number 1 and the chip position information is set such that the Am1 to Amn are incremented by one in decimal form, that is, by 01b every time the chip number is incremented by one, FIG. 14B shows the example in which "0000000001" is set for the chip number 1 and the chip position information is set such that the Am1 to Amn are incremented by two in decimal form, that is, by 10b every time the chip number is incremented by one, and FIG. 14C shows the example in which "0000000001" is set for the chip number 1 and the chip position information is set such that the Am1 to Amn are incremented by three in decimal form, that is, by 11b every time the chip number is incremented by one.

As shown in FIG. 14A, when the bits are incremented by one, the chip position information of the chip number 1 is "0000000001" and the chip position information of the chip number 3 is "0000000011". In this case, both are different only in low second bit, so that when some trouble is generated in the fuse corresponding to the low second bit, both become the same value.

As shown in FIG. 14B, when the bits are incremented by two, the chip position information of the chip number 1 is "0000000001" and the chip position information of the chip number 2 is "0000000011". In this case, both are different only in low second bit, so that when some trouble is generated in the fuse corresponding to the low second bit, both become the same value.

The above is not limited to the case the bits are incremented by one or two. In a case where the chip position information is incremented by $2^n$ (n=0, 1, 2, . . . :integer of 0 or more) such as four or eight, when some trouble is generated in the fuse corresponding to any one bit, its chip position information becomes the same as that of another one.

Meanwhile, in FIG. 14C, when the bits are incremented by three in decimal form, the chip position information of the chip number 1 is "0000000001" and the chip position information of the chip number 2 is "0000000100". In this case, both are different in the least significant bit and the low third bit, so that even when some trouble is generated in one fuse, its value does not become the same as another one. The same is true in other chip numbers.

Thus, when the chip position information is incremented by the number other than $2^n$, even though some trouble is generated in one fuse, it is not likely that the same chip position information exists.

In addition, although the description has been made of the chip position information on the wafer in the chip information in the above embodiment, the above may be applied to the lot number, wafer number, manufacturing date similarly and when the above is applied also to them, the uniqueness can be further enhanced.

As described above, according to the unique ID of the embodiment 5 of the present invention, when the information is incremented by the number other than 2″ in decimal form in setting the chip information, even through some trouble is generated in one fuse corresponding to one bit, it is not likely that the same chip information exists, so that the uniqueness of the unique ID can be further enhanced.

Embodiment 6

Although the description has been made of the constitution of the unique ID in the embodiments 4 and 5 of the present invention, a method for verifying the unique ID described in the embodiments 4 and 5 will be described in an embodiment 6 of the present invention.

Figure 15:
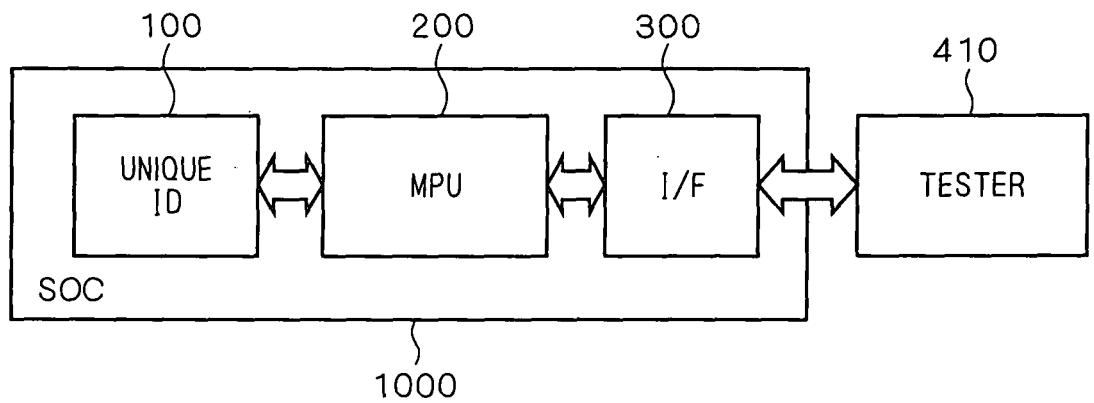
FIG. 15 is a block diagram to explain a constitution to verify the unique ID in a method for verifying the unique ID of the semiconductor device according to an embodiment 6.

FIG. 15 is a block diagram showing the constitution in which a tester 410 is connected to the SOC 1000 described with reference to FIG. 1.

As shown in FIG. 15, the SOC 1000 is connected to the tester 410 through the interface unit 300 and the unique ID is read from the fuse box 100 through the MPU 200 and verified.

At this time, since the unique ID of the semiconductor device in the present invention has the chip information and the inspection bit of the CRC operation, when the inspection bit of the CRC operation is verified by the tester 410, the whole unique ID can be verified.

The method for verifying the unique ID of the semiconductor device according to the present invention will be described with reference to a flowchart shown in FIG. 16 hereinafter.

Figure 16:
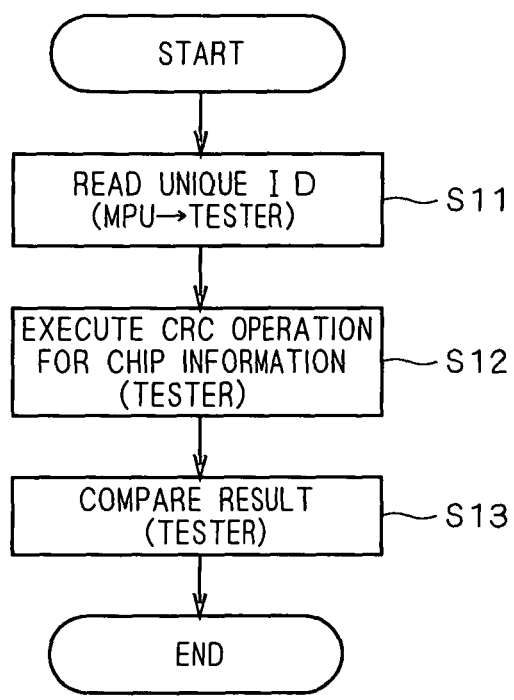
FIG. 16 is a flowchart to explain the method for verifying the unique ID according to the embodiment 6.

As shown in FIG. 16, the tester 410 instructs the MPU 200 through the interface unit 300 of the SOC 1000 to read the data of the unique ID recorded in the fuse box 100 and send it to the tester 410 at step S11.

Here, the read unique ID comprises the data of the A0 to An bits as shown in FIG. 10.

Then, the tester 410 executes the CRC operation for the chip information allocated to the A0 to Am bits in the unique ID (step S12).

That is, the tester 410 has the same generator polynomial G(X) as that used in calculating the inspection bit constituting the unique ID and it is provided with a function for executing the CRC operation for the chip information of the A0 to Am bits.

Then, at step S13, the remainder value provided by executing the CRC operation for the chip information using the generator polynomial G(X) is compared with the inspection bit allocated to the Am+1 to An bits in the unique ID and when both matches with each other, it is determined that the SOC 1000 is a good item, that is, there is no defective unique ID. Meanwhile, when both do not match with each other, it is determined that some trouble is generated in the unique ID of the SOC 1000.

In addition, although the description has been made of the case of the unique ID shown in FIG. 10 in the above embodiment, the unique ID shown in FIGS. 12 and 13 can be verified similarly.

Furthermore, although the remainder value provided by executing the CRC operation for the chip information using the generator polynomial G(X) is compared with the inspection bit allocated to the Am+1 to An bits in the unique ID and when both matches with each other, it is determined that the SOC 1000 to be verified is a good item, that is, there is no defective unique ID in the above description, it may be such that a polynomial including the chip information and the inspection bit of the CRC operation is divided by the generator polynomial G(X) and it is determined that it is a good item when its remainder value is "0".

As described above, according to the method for verifying the unique ID in the embodiment 6 of the present invention, since the whole unique ID can be verified only by verifying the inspection bit of the CRC operation in the tester 410, a defective unique ID in each chip can be easily verified.

Variation

Although description has been made of the case where the unique ID is verified by the external tester connected to the SOC 1000 in the method for verifying the unique ID described in the embodiment 6 of the present invention described above, the unique ID may be verified by the MPU 200 in the SOC 1000.

A variation of the method for verifying the unique ID according to the present invention will be described with reference to a flowchart shown in FIG. 17.

Figure 17:
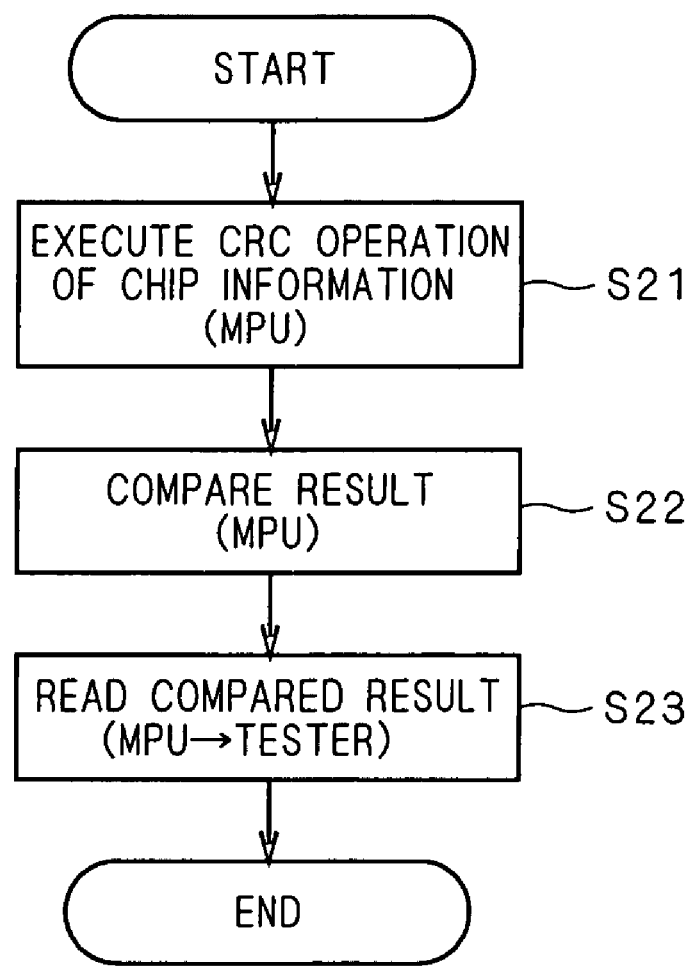
FIG. 17 is a flowchart to explain a variation of the method for verifying the unique ID according to the embodiment 6.

As shown in FIG. 17, at step S21, the tester 410 instructs the MPU 200 through the interface unit 300 of the SOC 1000 to read the data of the unique ID recorded in the fuse box 100. Then, the MPU 200 executes the CRC operation for the chip information allocated to the A0 to Am bits in the unique ID.

That is, the MPU 200 has the same generator polynomial G(X) as that used in calculating the inspection bit constituting the unique ID and it is provided with a function for executing the CRC operation for the chip information of the A0 to Am bits.

Then, the remainder value provided by executing the CRC operation for the chip information using the generator polynomial G(X) is compared with the inspection bit allocated to the Am+1 to An bits in the unique ID by the MPU 200 (step S22).

Then, at step S23, the tester 410 instructs the MPU 200 through the interface unit 300 of the SOC 1000 to read the information of a compared result provided at the step S22 and send it to the tester 410.

The tester 410 determines that the SOC 1000 to be verified is a good item, that is, there is no defective unique ID when it receives the information that the compared values match and determines that there is a defective unique ID of the SOC 1000 to be verified when it receives the information that the compared values do not match.

In addition, although the remainder value provided by executing the CRC operation for the chip information using the generator polynomial G(X) is compared with the inspection bit allocated to the Am+1 to An bits in the unique ID in the MPU 200 and when the tester 410 receives the information that both match with each other, it is determined that the SOC 1000 to be verified is a good item, that is, there is no defective unique ID in the above description, it may be such that a polynomial containing the chip information and the inspection bit of the CRC operation is divided by the generator polynomial G(X) and its remainder is compared with "0" in the MPU 200 and when the tester 410 receives the information that its compared values match, it determines that the SOC 1000 is a good item, that is, there is no defective unique ID.

As described above, according to the method for verifying the unique ID in the variation, since the whole unique ID can be verified only by verifying the inspection bit of the CRC operation in the MPU 200, it can be easily verified whether a trouble is generated in the unique ID in each chip or not. Furthermore, since the inspection bit of the CRC operation is verified in the MPU 200 and only the information of the compared result is sent to the tester 410, as compared with the method for verifying the unique ID described in the embodiment 3, the number of pins for testing in the interface unit 300 can be reduced.

While the invention has been shown and described in detail, the foregoing description is in all aspects illustrative and not restrictive. It is therefore understood that numerous modifications and variations can be devised without departing from the scope of the invention.

What is claimed is:

1. A semiconductor device having a unique ID that is uniquely set, the semiconductor device comprising:
   a nonvolatile storage unit; and
   a processing unit,
   wherein said unique ID is stored in said nonvolatile storage unit,
   wherein said stored unique ID comprises unique chip information containing information at the time of manufacturing of said semiconductor device and an inspection bit provided by executing a cyclic redundancy checking operation for said chip information,
   wherein said processing unit, checks the numbers of logical "0s" and "1s" in a bit stream indicating the unique chip information, bit inverts said bit stream when said number of the logical "1s" is more than a predetermined number, and stores said bit stream or bit inverted bit stream into the nonvolatile storage unit, and
   wherein said processing unit uses said stored unique ID in an unmodified form when the usage of said stored unique ID ensures the uniqueness, and bit inverts the stored unique ID when a current unique ID is equal in value to said stored unique ID being used,
   wherein said semiconductor device comprises a plurality of fuses as said nonvolatile storage unit, and said stored unique ID of the semiconductor device is recorded in said semiconductor device by forming a cut state and an uncut state of said plurality of fuses, and,
   wherein said chip information comprises at least a lot number at the time of manufacturing of said semiconductor device, a wafer number of a wafer on which said semiconductor device is formed, a chip position specifying a position of said semiconductor device on said wafer, and a manufacturing date.

2. The unique ID of the semiconductor device according to claim 1, wherein
   said chip information defines each information by incrementing binary data regularly, and
   a unit of said incrementing is other than $2^n$ ($n=0, 1, 2, \ldots$) in decimal form.

* * * * *